United States Patent
Panattu Sethumadhavan et al.

(10) Patent No.: US 9,059,998 B2
(45) Date of Patent: Jun. 16, 2015

(54) MEDIA PLANE OPTIMIZATION FOR VOICE OVER LTE

(75) Inventors: Santosh Panattu Sethumadhavan, San Jose, CA (US); Brian Kean, Cincinnati, OH (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 491 days.

(21) Appl. No.: 13/450,268

(22) Filed: Apr. 18, 2012

(65) Prior Publication Data

US 2013/0279494 A1 Oct. 24, 2013

(51) Int. Cl.
*H04L 12/66* (2006.01)
*H04L 29/06* (2006.01)

(52) U.S. Cl.
CPC ........ *H04L 65/1026* (2013.01); *H04L 65/1069* (2013.01); *H04L 65/1073* (2013.01)

(58) Field of Classification Search
CPC .................................................. H04L 65/1016
USPC ......................................................... 370/352
See application file for complete search history.

(56) References Cited

U.S. PATENT DOCUMENTS

| | | | |
|---|---|---|---|
| 2009/0282458 A1* | 11/2009 | Hjelm | 726/1 |
| 2012/0144049 A1* | 6/2012 | Lopez Nieto et al. | 709/228 |
| 2013/0007186 A1* | 1/2013 | Liu et al. | 709/213 |
| 2014/0013383 A1* | 1/2014 | Pancorbo-Marcos et al. | 726/1 |
| 2014/0146783 A1* | 5/2014 | Kim et al. | 370/329 |

FOREIGN PATENT DOCUMENTS

WO    WO 2012/048753    * 10/2010    ............. H04L 29/06

* cited by examiner

*Primary Examiner* — Shripal Khajuria
*Assistant Examiner* — Faisal Choudhury

(57) ABSTRACT

Methods and apparatus are disclosed for defining an optimized media path. In one exemplary method, a proxy session controller registers, for a plurality of realms, a plurality of Border Gateway Functions (BGFs) residing on a plurality of network nodes, with the registration including registering a preferred BGF colocated with a data network gateway on a single network node for a selected set of the realms. A request message is received from a user terminal, and if a realm associated with the request message is included in the selected set of realms, the controller assigns the preferred BGF to the user terminal to provide an optimized media path that includes the user terminal, the preferred BGF, and the data network gateway.

12 Claims, 9 Drawing Sheets

MEDIA PLANE OPTIMIZATION FOR VOICE OVER LTE

TECHNICAL FIELD

The present invention relates to the optimization of media paths for sessions, such as Voice over Long Term Evolution (VoLTE) sessions.

BACKGROUND

Historically, landline and cellular telephone networks have used circuit-switching to conduct voice calls. With circuit-switching, a route and bandwidth are reserved from source to destination for the duration of a call, even when neither calling party is speaking. Packet-switching, meanwhile, has historically been used for network data transmissions. Packet-switching divides data that is to be transmitted into small units, called "packets," that are independently transmitted through the network, which enables sharing of available network bandwidth between multiple communication sessions.

The recent Long Term Evolution (LTE) wireless communication standard from the 3rd Generation Partnership Project (3GPP) proposes omitting the circuit-switched domain, so that packet switching is used for voice as well as data transmissions. In such a network, voice communications (called "Voice over LTE" or "VoLTE") are packetized, and those packets travel through multiple network nodes before being delivered to an endpoint.

Voice and video communications are very delay sensitive, and even slight delays can be perceived by end users and can contribute to a negative user experience. If an excessive number of network nodes are traversed, higher network latency for voice and other media packets may occur, resulting in poor audio and/or video quality being experienced by users.

SUMMARY

According to one embodiment, a method of defining an optimized media path is implemented by a proxy session controller. According to the method, for each of a plurality of domains or "realms," a plurality of Border Gateway Functions (BGFs) residing on a plurality of network nodes are registered. The registration includes the registering of a preferred BGF colocated with a data network gateway on a single network node for a selected set of the realms. A request message is received from a user terminal, and if a realm associated with the request message is included in the selected set of realms, the preferred BGF is assigned to the user terminal to provide an optimized media path that includes the user terminal, the preferred BGF, and the data network gateway. A corresponding proxy session controller operative to perform the method is also disclosed.

In another embodiment, a method of defining an optimized media path is implemented by a policy controller. According to the method, the policy controller receives an indication from a data network gateway that the data network gateway is colocated on a network node with a Border Gateway Function (BGF). An indication that the colocated BGF is a preferred BGF for media paths including the data network gateway is then transmitted to a proxy session controller. A corresponding policy controller operative to perform the method is also disclosed.

In one example, the proxy session controller comprises a Proxy Call Session Control Function (P-CSCF), the policy controller comprises a Policy Charging and Rules Function (PCRF), and the data network gateway comprises a Packet Data Network Gateway ("PDN-GW").

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
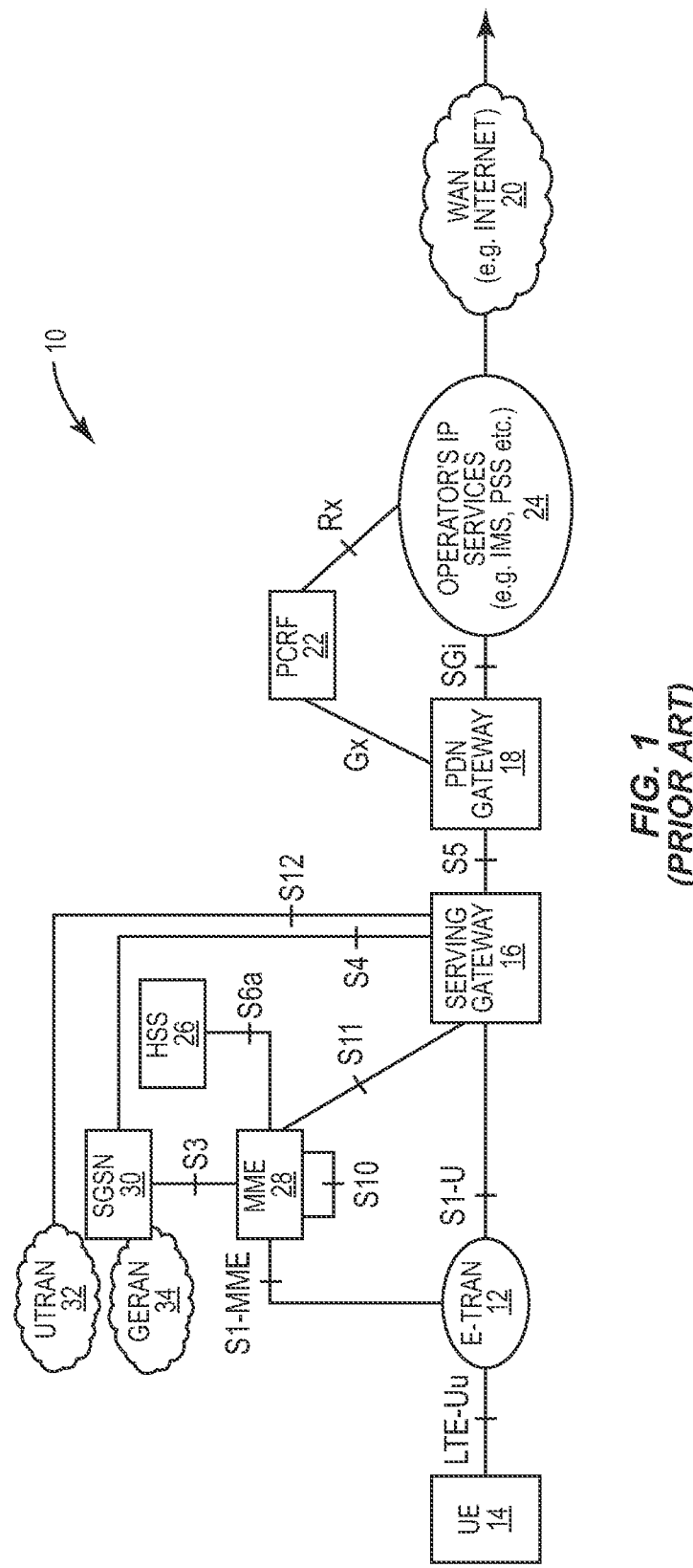
FIG. 1 is a block diagram of an exemplary wireless communication network.

FIG. 1 is a block diagram of an exemplary Long Term Evolution (LTE) wireless communication network 10 that uses the Session Initiation Protocol (SIP) to initiate media sessions between users. The network 10 includes an evolved UMTS Terrestrial Radio Access Network (E-UTRAN) 12 (with UMTS referring to "Universal Mobile Telecommunications System"). The E-UTRAN 12 is in communication with user equipment (UE) 14 via the "LTE-Uu" air interface. The E-UTRAN 12 includes one or more eNodeB base stations (not shown) for supporting wireless communication with the UE 14. As will be described below in greater detail, the UE may use SIP to initiate sessions with remote UEs.

A serving gateway (S-GW) 16 forwards data packets from the UE 14 to and from a destination via a Packet Data Network Gateway (PDN-GW) 18. The PDN-GW 18 provides connectivity from the UE 14 to external packet data networks (e.g. WAN 20) by being the point of exit and entry of traffic for the UE. The PDN-GW 18 also performs policy enforcement and packet filtering. The WAN 20 is a wide area network, such as the Internet.

Policy Charging and Rules Function (PCRF) 22 is connected to the PDN-GW 18 via the "Gx" interface, and assists with determining permitted services, and how those services will be billed. Network operator IP services 24 are connected to the PCRF 22 via the "Rx" interface. The Diameter protocol is used for signaling over the Gx and Rx interfaces. The network operator IP services 24 may include, for example, an IP Multimedia Subsystem (IMS) (with "IP" referring to "Internet Protocol"). IMS is a flexible network architecture defined by 3rd Generation Partnership Project (3GPP) for the delivery of real-time voice, video and multimedia services using Session Initiation Protocol (SIP) over packet-switched networks, with a focus on mobile wireless access networks. Of course, IMS is only disclosed as a non-limiting example IP service, and it is understood that other IP services may be used in addition to, or as an alternative to, IMS.

Home Subscriber Service (HSS) 26 is a database that contains user-related and subscription-related information for the UE 14. A Mobility Management Entity (MME) 28 interacts with the HSS 26 to perform user authentication, and transmits control plane signaling to the S-GW 16 (e.g. the UE 14 attaching to the wireless communication network 10). Serving GPRS Support Node (SGSN) 30 (with "GPRS" referring to "General Packet Radio Service") assists with packet routing and transfer for mobile terminals connected to legacy UTRAN 32 and GERAN 34 radio area networks. The network 10 uses SIP as a session control protocol. SIP is a session control protocol for establishing, modifying and terminating media sessions (e.g., voice, video, instant messaging, gaming, etc.). In SIP, user belongs to a larger group known as a domain (or "realm" to use 3GPP terminology). A "realm" (also known as an "IP Address Realm" or "IP Realm") is defined in IETF RFC 2663 as a network domain in which network addresses are uniquely assigned to entities such that datagrams (e.g. packets) can be routed to them.

Figure 2:
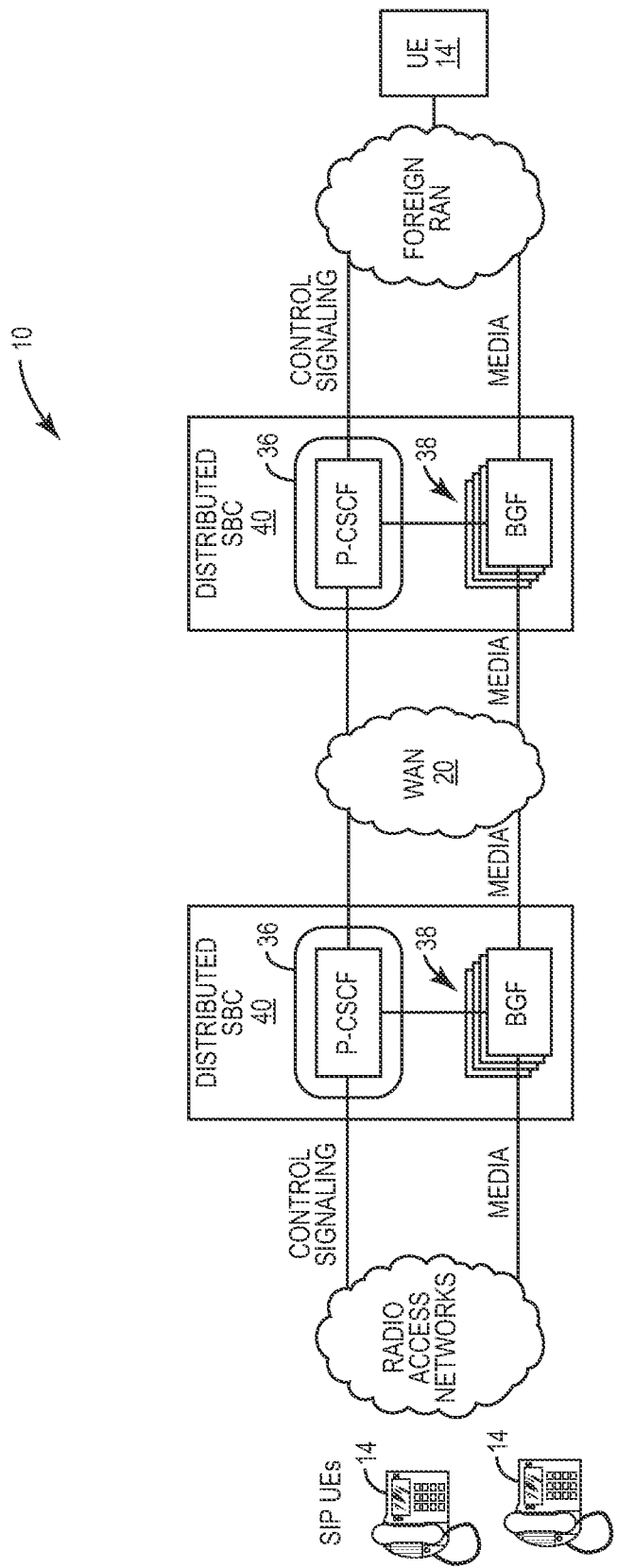
FIG. 2 is a block diagram schematically illustrating a control plane and a media plane in the network of FIG. 1.

FIG. 2 is a block diagram illustrating a "control plane" and a "media plane" in the network 10 of FIG. 1. The phrase "control plane" refers to signaling used to set up a session, whereas the phrase "media plane" refers to the data flow of packets within the session. One example session is a VoLTE session that facilitates voice communication between UE 14 and a remote UE 14'. Thus, control plane signaling would set up the VoLTE session, and media plane signaling would transmit data packets within the VoLTE session.

As shown in FIG. 2, control plane signaling passes from UE 14 through a radio access network (e.g. E-UTRAN 12) to a Proxy Call Session Control Function (P-CSCF) 36. The P-CSCF functions as an SIP proxy session controller to handle session control signaling between, for example, UE 14 and remote UE 14'. The P-CSCF 36 also selects one of a plurality of Border Gateway Functions (BGFs) 38 to be used for certain media plane transmissions. Each BGF 38 handles policy enforcement, and policing/monitoring of media-plane traffic. This may include performing Network Address Translation (NAT) to translate one address realm into another, and may also include bandwidth policing and security enforcement. Each P-CSCF 36 and its associated plurality of BGFs 38 collectively form a distributed session border controller (SBC) 40. The H.248 protocol is used for signaling between the P-CSCF and BGF.

Within LTE networks, the BGF is included in the media path for one or more first types of data flows (e.g. voice calls, streaming video) and is excluded from the media path for one or more second types of data flows (e.g. non-voice, non-video flows). A round-robin selection algorithm is generally used to select a BGF 38, which can result in a less than optimal selection, leading to increased latency during a VoLTE call.

Figure 3:
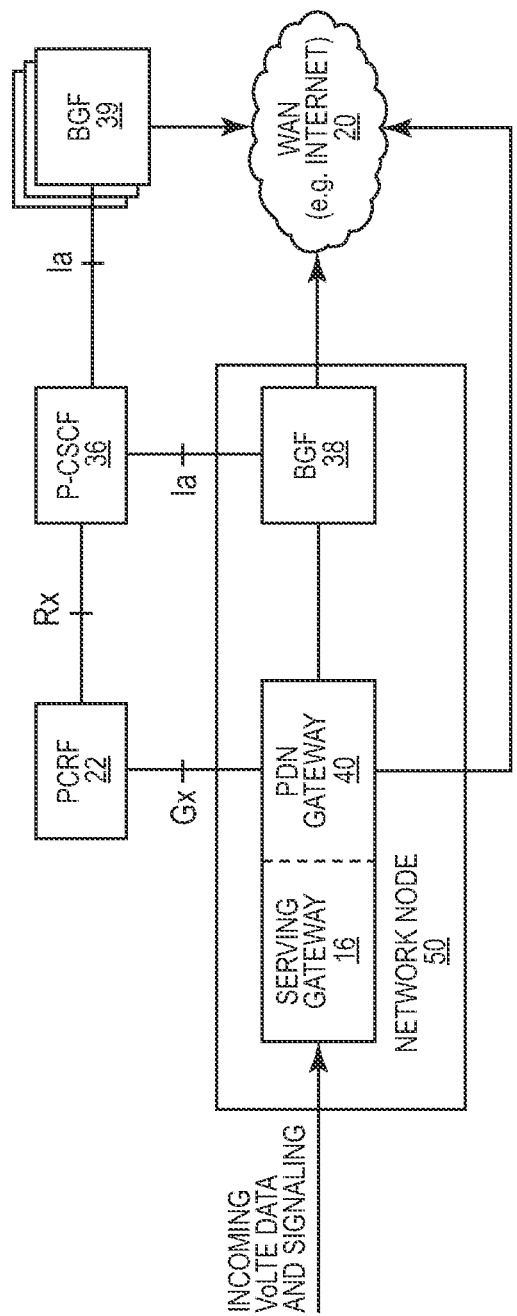
FIG. 3 schematically illustrates an exemplary network node including a colocated Serving Gateway (S-GW), Packet Data Network Gateway (PDN-GW), and Border Gateway Function (BGF).

FIG. 3 schematically illustrates an exemplary network node 50 including a colocated S-GW 16, PDN-GW 40 and BGF 38 to reduce such latency. Colocation of the S-GW 18, PDN-GW 38 and BGF 38 in a single network node can reduce latency during sessions (e.g. VoLTE sessions) by reducing the quantity of nodes that must be traversed by media plane packets, to provide an "optimized media path." Thus, while additional BGFs 39 are located outside of the node 50, BGF 38 is collocated in the node 50. In one example, network node 50 corresponds to one of a plurality of media plane cards mounted in a chassis, such as the Smart Service Router (SSR) available from Ericsson. In such a chassis, there may be a plurality of media plane cards each having a colocated S-GW, PDN-GW and BGF.

Figure 4:
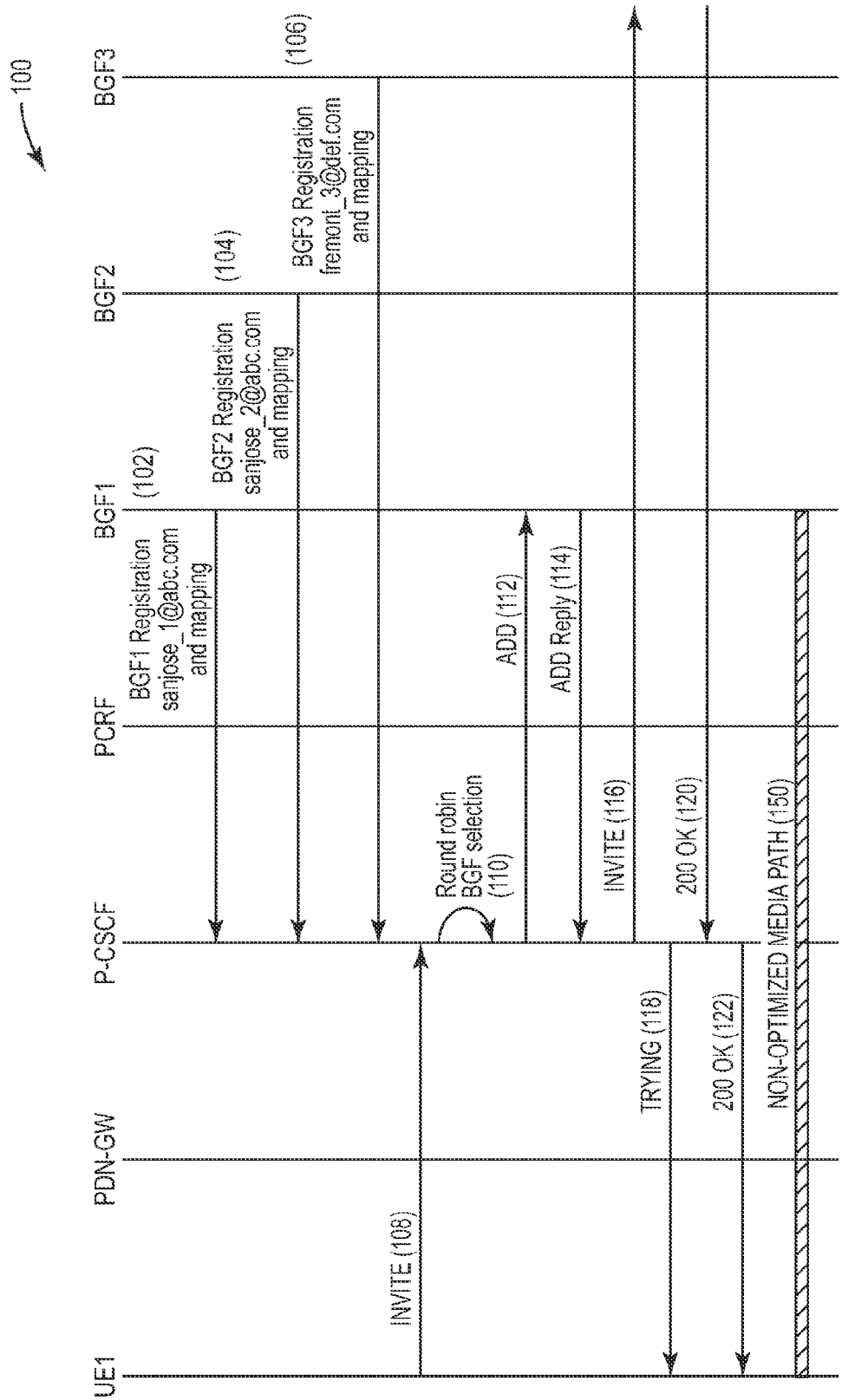
FIG. 4 illustrates a call flow diagram for a prior art BGF selection method.

FIG. 4 illustrates a call flow diagram 100 for a prior art BGF selection method in which three BGFs (i.e., BGF1, BGF2 and BGF3) are available, and a non-optimized media path 150 is established. BGF1 (which has a location id of "sanjose_1@abc.com") is registered with P-CSCF (step 102). BGF2 (which has a location id of "sanjose_2@abc.com") is also registered with the P-CSCF (step 104). BGF3 (which has a location ID of "fremont_3@def.com") is also registered with the P-CSCF 36 (step 106). Each BGF is registered for a set of realms, with the set including at least two realms, and possibly including four to six realms, for example. The registrations of steps 102-106 includes, for each BGF, the transmission of the location ID of the BGF along with a mapping of which realms that BGF supports (i.e., what realms are included in the BGF's "set of realms"). For example, BGF1 may be registered for the following realms: att.sanjose.com; att.sanfrancisco.com; and att.fremont.com. While it is possible that the "abc.com" portion of the location ID of BGF1 may correspond to a realm for which BGF1 is registered, that is not required, and "abc.com" may be only used as a part of the location ID without indicating any realms for which the BGF is registered. Thus, "abc.com" being part of the location ID of BGF1 should not be interpreted as meaning that BGF1 is limited to serving "abc.com" or that BGF1 serves "abc.com" at all. For FIGS. 3-5, we will assume that each of BGF1, BGF2 and BGF3 are registered for at least one of the same realms ("e.g., "myrealm.com").

The P-CSCF receives an SIP INVITE from UE1 (step 108), with the INVITE being associated with "myrealm.com" (this association can be detected by analyzing a header of the INVITE, or by analyzing an IP address of the INVITE, for example). A round robin BGF selection is performed to select one of the BGFs 38 registered for myrealm.com (step 110). In the example of FIG. 4, this results in the selection of BGF1, but it is understood that this is only an example outcome, and that if a round robin selection algorithm is used any one of the BGFs registered for myrealm.com may be selected. The P-CSCF notifies BGF1 that it has been selected via an H.248 ADD message (step 112), and confirmation is received from BGF1 as an H.248 ADD Reply (step 114). The P-CSCF then transmits an SIP INVITE message on behalf of UE1 to a remote UE (step 116), and an SIP TRYING message is returned to the UE1 14 to indicate the ongoing connection attempt (step 118). A SIP 200 OK message is received by the P-CSCF (step 120) and is relayed to the UE1 (step 122), to indicate acceptance of the invitation of step 116. The method 100 results in a non-optimized media path 150 that connects UE1 to BGF1 via PDN-GW, with no regard to the proximity between the PDN-GW and BGF1.

Figure 5:
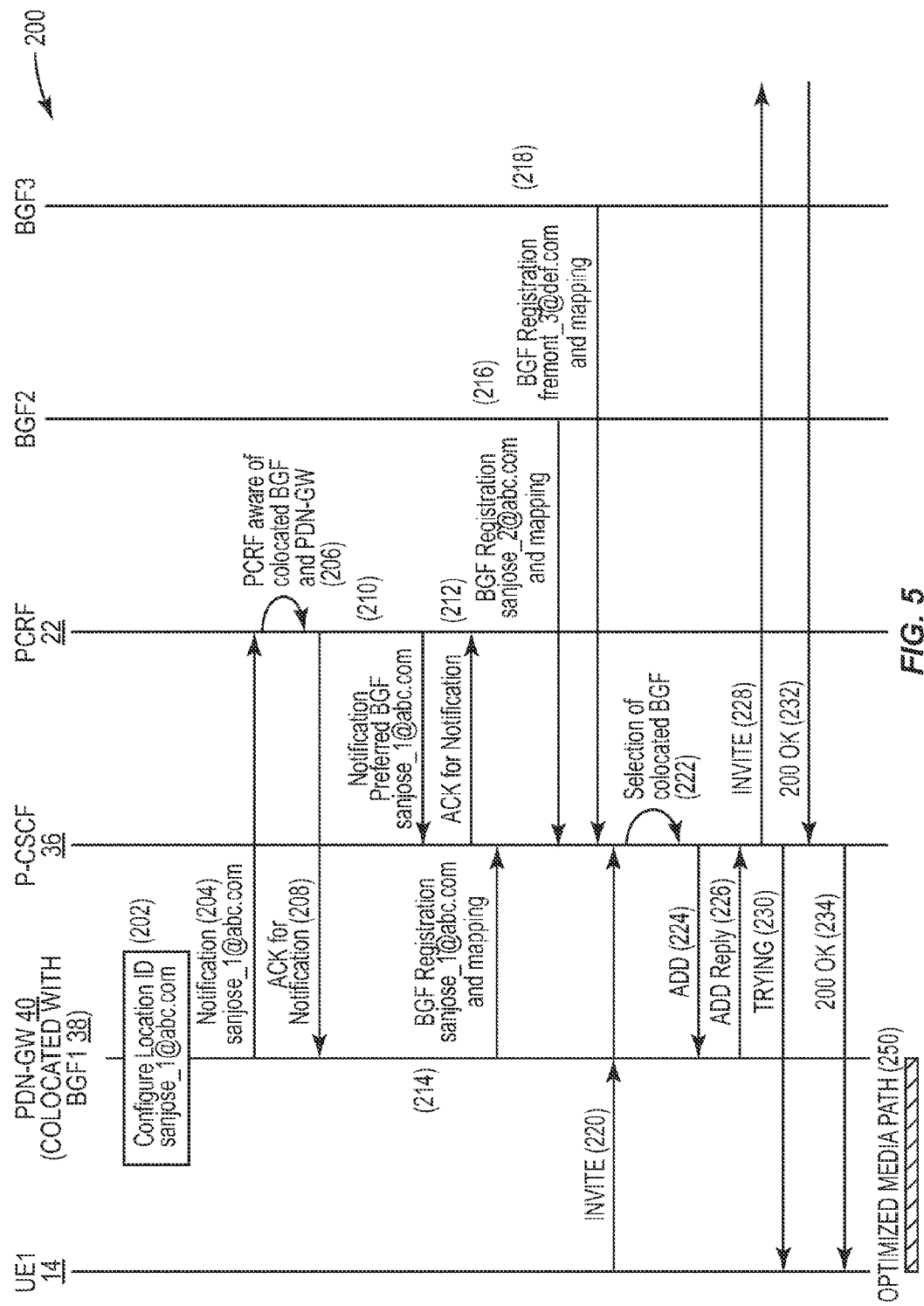
FIG. 5 illustrates an exemplary call flow diagram for a novel BGF selection method.

FIG. 5 illustrates a first exemplary call flow diagram 200 for a novel BGF selection method that defines an optimized media path 250 that includes the colocated PDN-GW 40 and BGF 38 of FIG. 3. BGF 38 is illustrated as "BGF1" in FIG. 5, and two of the BGFs 39 are illustrated as "BGF2" and "BGF3" in FIG. 5. Again, we will assume that each of BGF1, BGF2 and BGF3 are registered for at least one of the same realms (e.g. "myrealm.com"). Steps 202-212 outline how the P-CSCF 36 is notified of the collocation of the PDN-GW and BGF1. The location ID of BGF1 is configured in the PDN-GW 38 as "sanjose_1@abc.com" (step 202). The PCRF 22 receives a notification including the location ID of BGF1 and an indication that BGF1 is collocated with the PDN-GW (step 204). Upon receiving this notification, the PCRF 22 becomes aware that the PDN-GW 38 and BGF1 are colocated (step 206), and acknowledges this awareness in an ACK message (step 208). The PCRF 22 then notifies the P-CSCF 36 that BGF1 is a preferred BGF for UEs utilizing the PDN-GW 38 in a notification (step 210), and the P-CSCF 36 acknowledges this preference using a ACK message (step 212).

BGF1, BGF2 and BGF 3 are then registered with the P-CSCF 36, with the registration also including a transmission from the BGFs to the P-CSCF of the realms that each BGF is being registered for (steps 214, 216, 218). In this example, each mapping would indicate that myrealm.com is included in the set of realms for each BGF. An SIP INVITE message is received from UE1 (step 220). The SIP INVITE message is relayed by PDN-GW 40. If a realm associated with the SIP message (e.g., "myrealm.com") matches one of the realms registered for the preferred BGF (i.e., BGF1 that is collocated with PDN-GW 40), the P-CSCF selects the colocated BGF1 for the requested SIP session (step 222). The P-CSCF may determine the realm associated with the SIP message by either obtaining the realm from a header of SIP INVITE message, or by analyzing an IP address of the SIP message. The P-CSCF 36 notifies BGF1 that it has been selected via H.248 ADD message (step 224), and confirmation is received from the BGF1 as an H.248 ADD Reply (step 226). The P-CSCF 36 then transmits an SIP INVITE message on behalf of UE1 to a remote UE (step 228), and an SIP TRYING message is returned to the UE1 to indicate the ongoing connection attempt (step 230). A SIP 200 OK message is received by the P-CSCF (step 232) and is relayed to the UE1 (step 234), to indicate acceptance of the invitation of step 116. The method 200 results in an optimized media path 250 that utilizes the colocated PDN-GW and BGF1 to minimize latency and improve user experience by reducing the number of nodes that must be traversed by media plane signaling.

Figure 6:
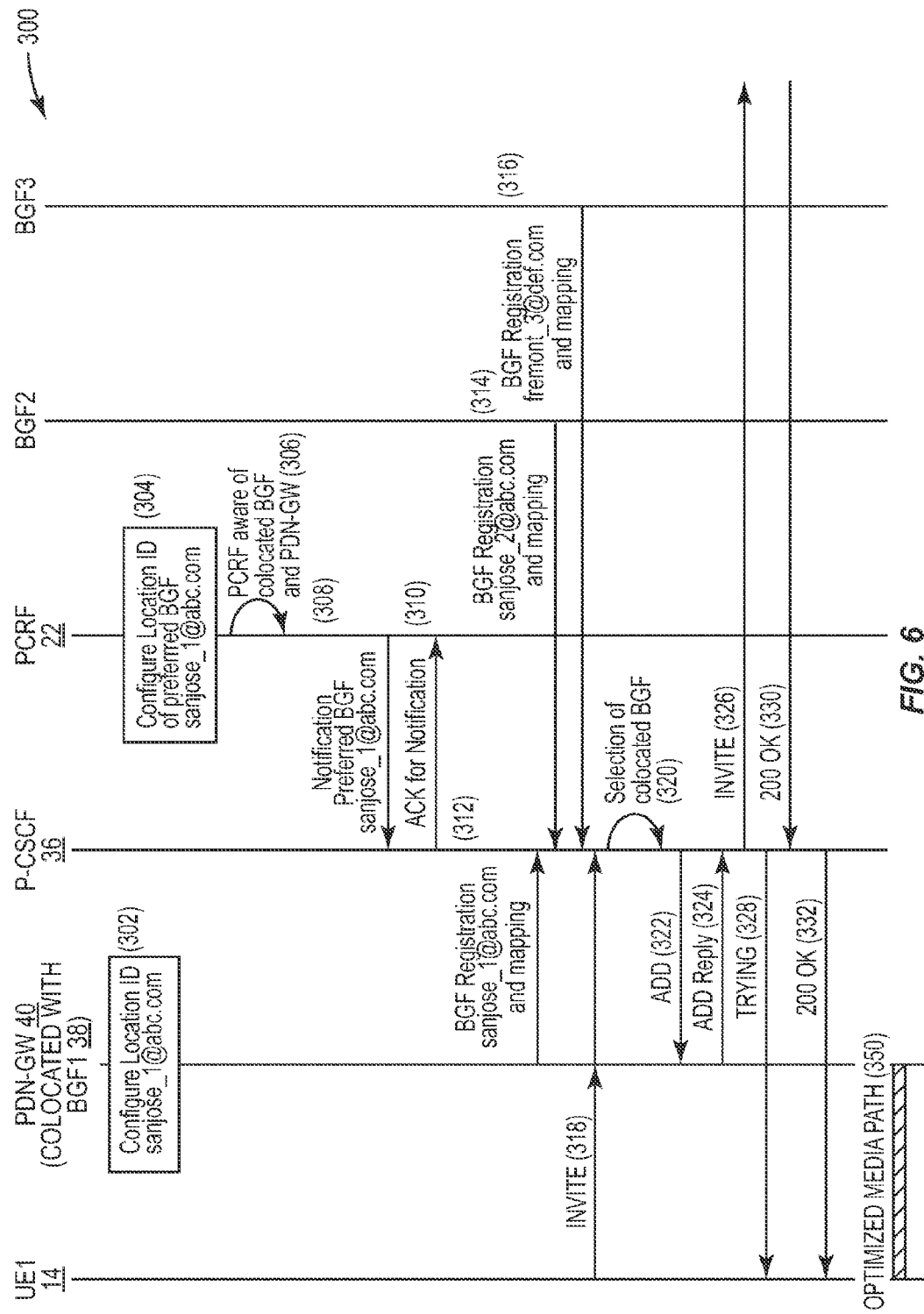
FIG. 6 illustrates another exemplary call flow diagram for a novel BGF selection method.

FIG. 6 illustrates another exemplary call flow diagram 300 for a novel BGF selection method, which defines an optimized media path 350 that includes the colocated PDN-GW 40 and BGF 38 of FIG. 3. BGF 38 is illustrated as "BGF1" in FIG. 5, and two of the BGFs 39 are illustrated as "BGF2" and "BGF3" in FIG. 5. The call flow diagram 300 differs from call flow diagram 200 in that the PCRF is instructed of the colocation of the PDN-GW and BGF1 without using PDN-GW to PCRF communications. Thus, steps 302-304 may correspond to a manual configuration by a technician, for example. To elaborate, the location ID of BGF1 is configured in the PDN-GW 38 as "sanjose_1@abc.com" (step 302), and the PCRF 22 is separately notified of this location ID without utilizing PDN-GW to PCRF communications (step 304). Thus, step 304 includes the PCRF 22 receiving a notification including the location ID of BGF1 and an indication that BGF1 is collocated with the PDN-GW (step 204). The PCRF then becomes aware of the colocation (step 306). The PCRF notifies the P-CSCF that colocated BGF1 is a preferred BGF for UEs utilizing the PDN-GW 38 in notification (step 308), and the P-CSCF acknowledges this preference in an ACK message (step 310). Remaining steps 312-332 operate the same as described above with regards to steps 214-234 of FIG. 5.

Figure 7:
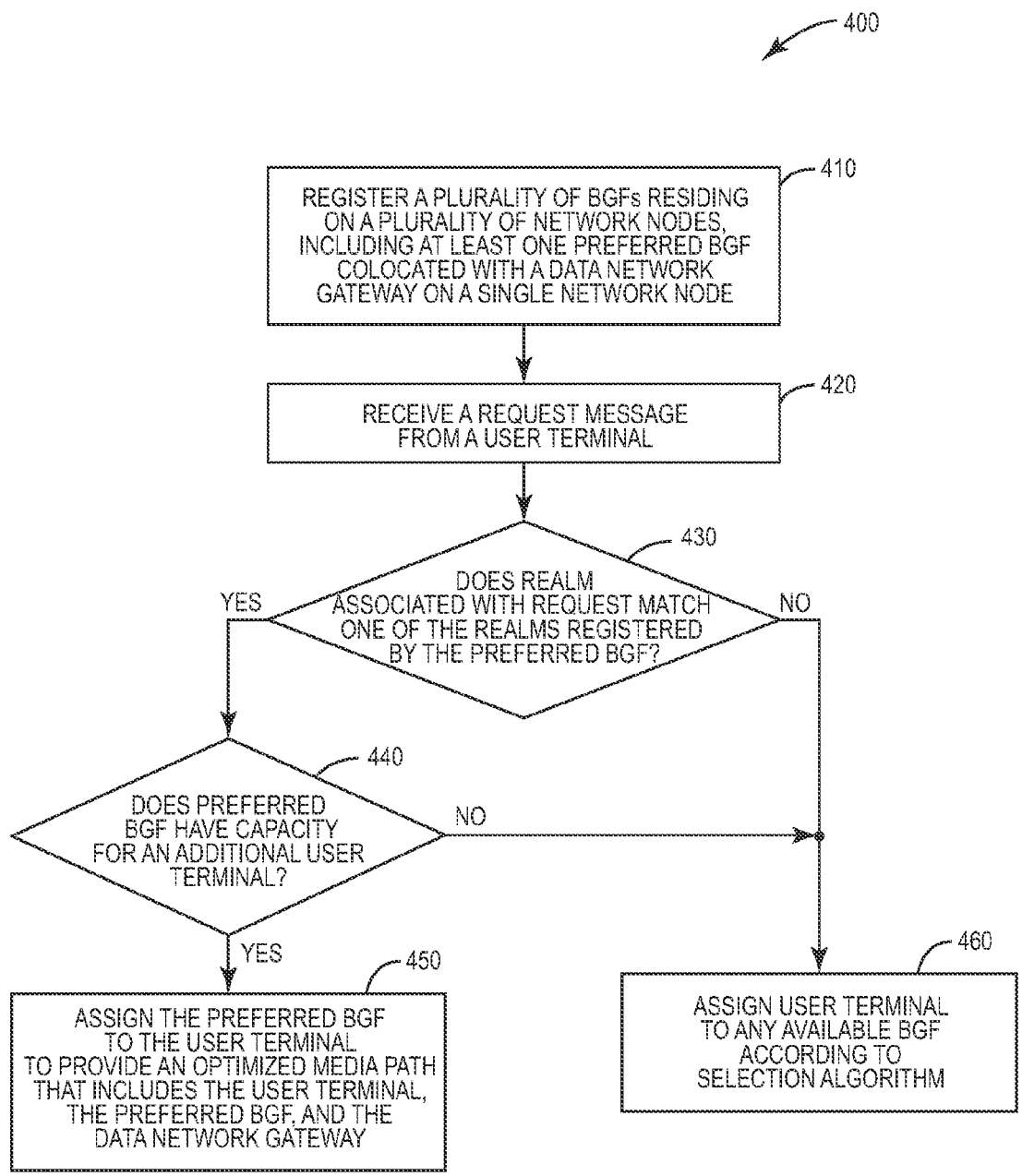
FIG. 7 illustrates a method that is implemented by a proxy session controller to define an optimized media path utilizing a selected BGF.

FIG. 7 illustrates a method 400 for defining an optimized media path utilizing a selected BGF, with the method 400 being implemented by a proxy session controller (e.g. the P-CSCF 36). The proxy session controller registers, for a plurality of realms, a plurality of BGFs residing on a plurality of network nodes (step 410). The registration of step 410 includes registering a preferred BGF colocated with a data network gateway (e.g. PDN-GW 40) on a single network node for a selected set of the realms. This "single network node" may correspond to the network node 50 including colocated PDN-GW 40 and BGF 38, for example.

A request message (e.g. an SIP INVITE request) is received from a user terminal, such as a UE (step 420). A check is then performed to determine if a realm associated with the request message matches one of the realms registered by the preferred BGF (i.e. is part of a set of realms registered for the preferred BGF) (step 430). If there is a match, a check is performed to determine if the preferred BGF has capacity for an additional terminal (step 440). If there is a match, and there is capacity, then the proxy session controller assigns the preferred BGF to the user terminal to provide an optimized media path that includes the user terminal and the colocated preferred BGF and data network gateway (step 450). Otherwise, if there is no match, or if there is a match but the preferred BGF has insufficient capacity, any one of a number of other available BGFs may be assigned according to a BGF selection algorithm (e.g. a round robin selection) (step 460).

Figure 8:
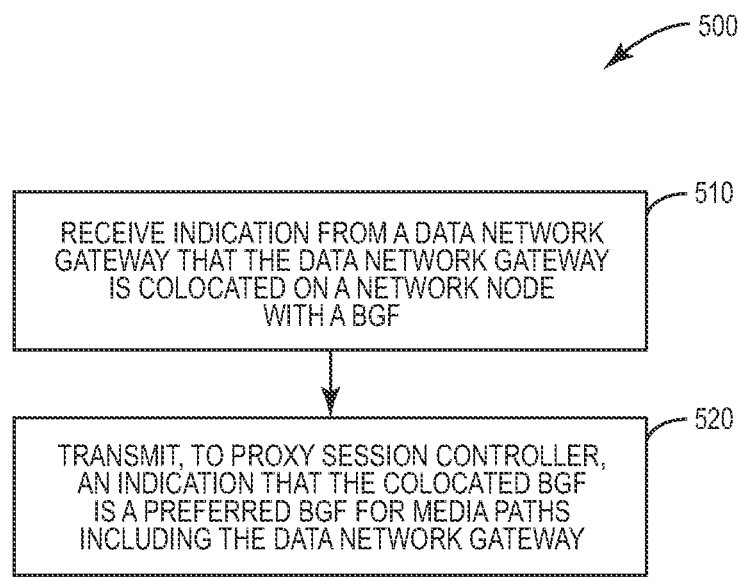
FIG. 8 illustrates a method that is implemented by a policy controller to define an optimized media path utilizing a selected BGF.

FIG. 8 illustrates a method 500 of defining an optimized media path utilizing a selected BGF, with the method 500 being implemented by a policy controller (e.g. PCRF 22). The policy controller receives an indication from a data network gateway (e.g. PDN-GW 18) that the data network gateway is colocated on a network node with a BGF (step 510). This "single network node" may correspond to the network node 50 including colocated PDN-GW 40 and BGF 38, for example. The policy controller then transmits, to a proxy session controller (e.g., P-CSCF 36), an indication that the colocated BGF is a preferred BGF for media paths including the data network gateway (step 520).

Figure 9:
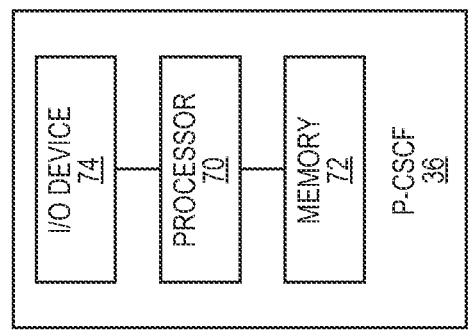
FIG. 9 schematically illustrates an exemplary Proxy Call Session Control Function (P-CSCF) network node.

FIG. 9 schematically illustrates an example P-CSCF 36 operative to implement the method 400. The P-CSCF 36 includes a processor 70, memory 72, and one or more input/output devices 74. The processor 70 includes one or more control circuits operative to perform the method 400, and may include software, hardware, or any combination thereof. If software is utilized, memory 72 may be used to store instructions for performing the method. I/O device 74 facilitates communication between the P-CSCF and other network components.

Figure 10:
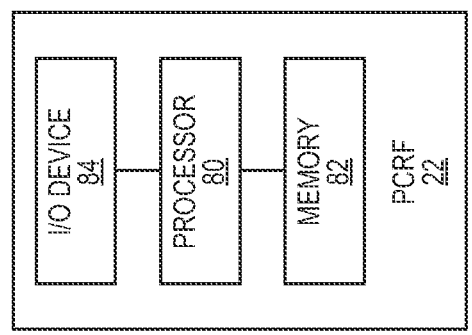
FIG. 10 schematically illustrates an exemplary Policy Charging & Rules Function (PCRF) network node.

FIG. 10 schematically illustrates an example PCRF 22 operative to implement the method 500. The PCRF 22 includes a processor 80, memory 82, and one or more input/output devices 84. The processor 80 includes one or more control circuits operative to perform the method 400, and may include software, hardware, or any combination thereof. If software is utilized, memory 82 may be used to store instructions for performing the method. I/O device 84 facilitates communication between the PCRF 22 and other network components.

Figure 11:
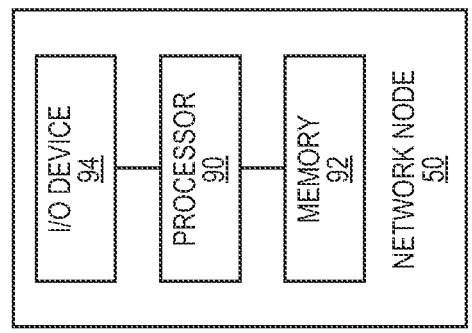
FIG. 11 schematically illustrates an exemplary network node including a collocated data network gateway and border gateway function.

FIG. 11 schematically illustrates an example network node 50 including the collocated PDN-GW 40 and BGF 38. As discussed above, in one example, the network node 50 may correspond to one of a plurality of media plane cards mounted in a chassis, such as the Smart Service Router (SSR) available from Ericsson. The network node 50 includes a processor 90, memory 92, and one or more input/output devices 94. The processor 90 includes one or more control circuits operative to perform the signaling of the PDN-GW 40 and the BGF 38 (and optionally the S-GW 16), and may include software, hardware, or any combination thereof. If software is utilized, memory 92 may be used to store instructions for performing the method. I/O device 94 facilitates communication between the network node 50 and other network components.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method of defining an optimized media path, the method being implemented by a proxy session controller and comprising:
    registering, for a plurality of realms, a plurality of Border Gateway Functions (BGFs) residing on a plurality of network nodes, said registering including registering a preferred BGF colocated with a data network gateway on a single network node for a selected set of the realms;
    receiving a request message from a user terminal; and
    if a realm associated with the request message is included in the selected set of realms, assigning the preferred BGF to the user terminal to provide an optimized media path that includes the user terminal, the preferred BGF, and the data network gateway, wherein the proxy session controller comprises a Proxy Call Session Control Function (P-CSCF) network node and the data network gateway comprises a Packet Data Network Gateway (PDN-GW).

2. The method of claim 1, wherein the data network gateway and the selected BGF are colocated on a media plane network card in the single network node.

3. The method of claim 2, wherein a routing gateway is colocated on the media plane network card with the data network gateway and the preferred BGF, and is also included in the optimized media path.

4. The method of claim 1, further comprising:
    initiating, responsive to the request message from the user terminal, a Voice over Long Term Evolution (VoLTE) session that utilizes the optimized media path.

5. A method of defining an optimized media path, the method being implemented by a policy controller, the method comprising:
    receiving an indication from a data network gateway that the data network gateway is colocated on a network node with a Border Gateway Function (BGF); and
    transmitting, to a proxy session controller, an indication that the colocated BGF is a preferred BGF for media paths including the data network gateway, wherein the policy controller comprises a Policy Charging and Rules Function (PCRF) network node, the proxy session controller comprises a Proxy Call Session Control Function (P-CSCF) and the data network gateway comprises a Packet Data Network Gateway (PDN-GW).

6. The method of claim 5, wherein the data network gateway and the preferred BGF are colocated on a media plane network card in the single network node.

7. A proxy session controller comprising one or more control circuits configured to:
    register, for a plurality of realms, a plurality of Border Gateway Functions (BGFs) residing on a plurality of network nodes, the registration including a preferred BGF colocated with a data network gateway on a single network node for a selected set of the realms;
    receive a request message from a user terminal; and
    if a realm associated with the request message is included in the selected set of realms, assign the preferred BGF to the user terminal to provide an optimized media path that includes the user terminal, the preferred BGF, and the data network gateway, wherein the proxy session controller comprises a Proxy Call Session Control Function (P-CSCF) network node and the data network gateway comprises a Packet Data Network Gateway (PDN-GW).

8. The proxy session controller of claim 7, wherein the data network gateway and the selected BGF are colocated on a media plane network card in the single network node.

9. The proxy session controller of claim 8, wherein a routing gateway is colocated on the media plane network card with the data network gateway and the preferred BGF, and is also included in the optimized media path.

10. The proxy session controller of claim 7, wherein the one or more control circuits are further configured to:
    initiate, responsive to the request message from the user terminal, a Voice over Long Term Evolution (VoLTE) session that utilizes the optimized media path.

11. A policy controller comprising one or more control circuits configured to:
    receive an indication from a data network gateway that the data network gateway is colocated on a network node with a Border Gateway Function (BGF); and
    transmit, to a proxy session controller, an indication that the colocated BGF is a preferred BGF for media paths including the data network gateway, wherein the one or more control circuits correspond to a Policy Charging and Rules Function (PCRF) network node, the proxy session controller comprises a Proxy Call Session Control Function (P-CSCF) network node and the data network gateway comprises a Packet Data Network Gateway (PDN-GW).

12. The policy controller of claim 11, wherein the data network gateway and the preferred BGF are colocated on a media plane network card in the single network node.

* * * * *